(12) United States Patent
Kaneko

(10) Patent No.: US 8,164,778 B2
(45) Date of Patent: Apr. 24, 2012

(54) MANAGEMENT SERVER, IMAGE FORMING APPARATUS, AND MANAGEMENT METHOD THEREFOR

(75) Inventor: Tsuyoshi Kaneko, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 643 days.

(21) Appl. No.: 12/368,862

(22) Filed: Feb. 10, 2009

(65) Prior Publication Data

US 2009/0213418 A1    Aug. 27, 2009

(30) Foreign Application Priority Data

Feb. 27, 2008   (JP) .................. 2008-046585

(51) Int. Cl.
*G06F 3/12* (2006.01)
(52) U.S. Cl. .................... 358/1.15; 358/1.14; 714/25
(58) Field of Classification Search .............. 358/1.1, 358/1.14, 1.15; 714/25
See application file for complete search history.

(56) References Cited

U.S. PATENT DOCUMENTS

| | | |
|---|---|---|
| 2002/0097444 A1 | 7/2002 | Shibata |
| 2004/0252324 A1 | 12/2004 | Ohta |
| 2005/0248805 A1 | 11/2005 | Shima |
| 2005/0286073 A1 | 12/2005 | Christopher |
| 2006/0282188 A1 | 12/2006 | Ogushi |
| 2008/0126860 A1* | 5/2008 | Sampath et al. ............... 714/25 |

FOREIGN PATENT DOCUMENTS

| | | | |
|---|---|---|---|
| CN | 1512390 A | | 7/2004 |
| EP | 1435573 A2 | * | 7/2004 |
| EP | 1729483 A1 | | 12/2006 |
| JP | 2001-024830 A | | 1/2001 |

* cited by examiner

*Primary Examiner* — King Poon
*Assistant Examiner* — Iriana Cruz
(74) *Attorney, Agent, or Firm* — Canon USA Inc IP Division

(57) ABSTRACT

A management server manages a plurality of image forming apparatuses capable of executing a data communication and executes processing for dispatching a service engineer with respect to an image forming apparatus. The management server executes first detection processing for detecting an image forming apparatus that requires the dispatch of a service engineer based on first analysis processing executed by using either one or both of operation information and failure information about the plurality of image forming apparatuses stored on RAM. The management server executes second detection processing for detecting an image forming apparatus that requires the dispatch of a service engineer based on second analysis processing executed by either one or both of the stored operation information and failure information about the plurality of image forming apparatuses in response to the first detection processing having detected the image forming apparatus that requires the dispatch of a service engineer.

11 Claims, 19 Drawing Sheets

FIG.4

| ANALYSIS ITEM | DETERMINATION CRITERION |
|---|---|
| JAMMING LEFT UNSOLVED | JAMMING HAS NOT BEEN SOLVED EVEN AFTER TWENTY MINUTES OR MORE HAS PASSED SINCE ITS OCCURRENCE |
| FREQUENT JAMMING | FREQUENCY OF JAMMING IS BELOW THRESHOLD VALUE "300" (COUNTER OF INTERVAL BETWEEN JAMMING/NUMBER OF TIMES OF JAMMING) |
| ERROR MONITORING | DEVICE HAS NOT RECOVERED FROM ERROR AFTER SIXTY MINUTES OF MORE HAS PASSED SINCE OCCURRENCE OF SERVICE CALL ERROR |
| NO RESPONSE FROM DEVICE FOR SEVEN DAYS | THERE IS NO COMMUNICATION FROM DEVICE FOR SEVEN DAYS |

FIG.5

| ANALYSIS ITEM | DETERMINATION CRITERION |
|---|---|
| COLOR INFORMATION | VALUE OF COLOR INFORMATION EXTREMELY DIFFERS FROM REFERENCE VALUE |
| SCHEDULE TRANSMISSION DELAY | SCHEDULE DELAY HAS OCCURRED TWICE OR MORE WITHIN ONE WEEK |
| FAILURE PREDICTED BY ANALYZING SUB LOG | PROCESSING-WAITING OCCASION HAS OCCURRED DUE TO ABNORMAL TEMPERATURE IN FIXING UNIT |
| PREDICTED LIFE EXHAUSTION OF EACH DRUM MODEL | DRUM EXHAUSTION RATE HAS EXCEEDED AVERAGE LIFE OF EACH MODEL |
| IMAGE FAILURE PREDICTED BY ANALYZING SUB LOG | PHENOMENON OF ABNORMAL TEMPERATURE IN FIXING UNIT OCCURS AT HIGH FREQUENCY |

| IMAGE FORMING APPARATUS ID | CUSTOMER NAME | INSTALLATION LOCATION |
|---|---|---|
| DEV0000000001 | CUSTOMER A | 31ST FL., BLDG. C |
| DEV0000000002 | CUSTOMER A | 31ST FL., BLDG. C |
| DEV0000000003 | CUSTOMER A | 31ST FL., BLDG. C |
| DEV0000000004 | CUSTOMER A | 31ST FL., BLDG. C |
| DEV0000000005 | CUSTOMER A | 31ST FL., BLDG. C |
| DEV0000000006 | CUSTOMER A | 12ST FL., BLDG. A |
| DEV0000000007 | CUSTOMER B | ROOM #32 |
| DEV0000000008 | CUSTOMER B | ROOM #32 |
| DEV0000000009 | CUSTOMER C | 1ST FL. |

| IMAGE FORMING APPARATUS ID | REPAIR REQUEST STATUS | REPAIR REQUEST DESCRIPTION |
|---|---|---|
| DEV0000000001 | | |
| DEV0000000002 | ○ | IMAGE FAILURE |
| DEV0000000003 | | |
| DEV0000000004 | | |
| DEV0000000005 | | |

FIG.7

| ANALYSIS ITEM | REPAIR REQUEST DESCRIPTION |
|---|---|
| COLOR INFORMATION | IMAGE FAILURE |
| SCHEDULE TRANSMISSION DELAY | COMMUNICATION FAILURE |
| FAILURE PREDICTED BY ANALYZING SUB LOG | OTHER FAILURES |
| PREDICTED LIFE EXHAUSTION OF EACH DRUM MODEL | OTHER FAILURES |
| IMAGE FAILURE PREDICTED BY ANALYZING SUB LOG | IMAGE FAILURE |

| IMAGE FORMING APPARATUS ID | REPAIR REQUEST STATUS | REPAIR REQUEST DESCRIPTION |
|---|---|---|
| DEV0000000001 | | |
| DEV0000000002 | ○ | IMAGE FAILURE |
| DEV0000000003 | ○ | COMMUNICATION FAILURE |
| DEV0000000004 | | |
| DEV0000000005 | ○ | OTHER FAILURES |

REPAIR REQUEST NOTIFICATION DETAILS

The contract service end date has expired

Customer Information
Name: Xxxxx Inc. Customer1
Customer ID: TEST1
Address1: 246
Address2: 246
Address3: 246
Address4: 246
Zip Code: 11111
Time Zone: JAPAN
Contract Type: VIP

Contact (Device)
Name: N/A
Tel: N/A
Mobile Phone Number: N/A
Fax: N/A
E-mail Address: N/A
Device Installation Location: N/A
Building Name: N/A
Address1: N/A
Address2: N/A
Address3: N/A
Address4: N/A
Zip Code: N/A

Contact (RDS)
Name: Contact
Tel: 111
Mobile Phone Number: 222
Fax: 222
E-mail Address: N/A
RDS Installation Location: N/A
Building Name: Xxxx Inc. (OIPQA)
Address1: 246
Address2: 246
Address3: 246
Address4: 246
Zip Code: 11111

RDS Communication
DEVICE ID: DEV000000002
Date and Time Sent (Local): 09-12-2002 19:36 (+09:00)
Date and Time Sent (GMT): 09-12-2002 11:36
Reference Number: 21209006557
RDS Version: eRDS V1.3
Date and Time Received (Local): 09-12-2002 20:01 (+09:00)
Date and Time Received (GMT): 09-12-2002 07:12

REPAIR REQUEST NOTIFICATION

| Device ID | Product Name | REPAIR REQUEST DESCRIPTION | ALARM CODE | Counter Total |
|---|---|---|---|---|
| DEV000000002 | IMV0013 | IMAGE FAILURE | 370001 | 8744 |

OTHER REPAIR REQUEST TARGET DEVICE

| Device ID | Product Name | REPAIR REQUEST DESCRIPTION | ALARM CODE | Counter Total |
|---|---|---|---|---|
| DEV000000003 | IMV0013 | COMMUNICATION FAILURE | 370002 | 8744 |
| DEV000000005 | IMV0013 | OTHER FAILURES | 370004 | 8744 |

Details
REPAIR REQUESTING BUTTON HAS BEEN PRESSED WITH RESPECT TO "IMAGE FAILURE" ON DEV000000002. DEVICES OTHER THAN THIS DETERMINED TO BE REPAIR TARGET EXIST.

FIG.14

| Subject: <CUSTOMER NAME>/          /<PRODUCT NAME>/<DEVICE> |
|---|

Body:
  REPAIR REQUESTING BUTTON HAS BEEN PRESSED ON CUSTOMER'S DEVICE.
  PLEASE CHECK DETAILED INFORMATION AT THE FOLLOWING URL:
  http://xxxxxxxxxxx
  OCCURRENCE DATE AND TIME: 2007-02-15 09:35
  RECEIVING DATE AND TIME: 2007-02-15 09:42 (+09:00)
  DEVICE ID: DEV0000000002
  ALARM CODE: 370001
  DETAILED DESCRIPTION: IMAGE FAILURE SALES ORGANIZATION ID: XXXXX
  SERVICE SHOP NAME/SALES SHOP NAME: XX-XXXXX
  CUSTOMER NAME: XXXYYY Co., Ltd.
  CUSTOMER ID: XXXXXXXXXX
  CUSTOMER ADDRESS: XX-XX-XXX, KONAN, MINATO-KU, TOKYO
  DEVICE INSTALLATION LOCATION: 20TH FL. WESTERN AREA
  TELEPHONE NUMBER: 03XXXXXXXX NOTE THAT FOLLOWING OTHER REPAIR TARGET DEVICES EXIST.
  DEVICE ID: DEV0000000003
  ALARM CODE: 370002
  DETAILED DESCRIPTION: COMMUNICATION FAILURE DEVICE ID: DEV0000000005
  ALARM CODE: 370004
  DETAILED DESCRIPTION: OTHER FAILURES

FIG.18

STORAGE MEDIUM SUCH AS FD/CD-ROM

| DIRECTORY INFORMATION |
|---|
| PROGRAM CODE CORRESPONDING TO STEPS IN FLOW CHART OF FIG. 8 |
| PROGRAM CODE CORRESPONDING TO STEPS IN FLOW CHART OF FIG. 15 |

FIG.19

STORAGE MEDIUM SUCH AS FD/CD-ROM

| DIRECTORY INFORMATION |
|---|
| PROGRAM CODE CORRESPONDING TO STEPS IN FLOW CHART OF FIG. 10 |
| PROGRAM CODE CORRESPONDING TO STEPS IN FLOW CHART OF FIG. 11 |
| PROGRAM CODE CORRESPONDING TO STEPS IN FLOW CHART OF FIG. 16 |
| PROGRAM CODE CORRESPONDING TO STEPS IN FLOW CHART OF FIG. 17 |
| |

MANAGEMENT SERVER, IMAGE FORMING APPARATUS, AND MANAGEMENT METHOD THEREFOR

BACKGROUND OF THE INVENTION

1. Field of the Invention

The present invention relates to a management server configured to execute processing for dispatching a service engineer by processing image forming apparatus information acquired by communicating with a plurality of image forming apparatuses and also relates to an image forming apparatus configured to communicate with the management server.

2. Description of the Related Art

A conventional image forming apparatus, such as a printing apparatus or a copying machine, detects an error occurring on the image forming apparatus itself and notifies information about the detected error to the management server. The management server analyzes whether it is necessary to dispatch a service engineer based on the notified information. Furthermore, if it is determined as a result of the analysis that it is necessary to dispatch a service engineer, then the conventional image forming apparatus transmits necessary information to the image forming apparatus (see Japanese Patent Application Laid-Open No. 2001-24830).

The conventional analysis like this is always executed by the management server. On the other hand, an analysis for predicting a failure or an error occurring on an image forming apparatus based on operation information and failure information that has been transmitted from a plurality of image forming apparatuses and stored in the management server is executed on the empirical basis and is not always executed.

However, in the above-described conventional method, the management server is subjected to a high processing load in making a prediction of a failure of an image forming apparatus based on an analysis of the stored information. Accordingly, it is difficult to always execute the error predicting analysis. Furthermore, in the case where a service engineer has been dispatched based on a result of the failure prediction executed based on the above-described stored information, if it is actually found that the image forming apparatus may normally operate for a while (that is, the predicted failure may not occur soon), then the costs for dispatching the service engineer may become wasteful.

In addition, the above-described conventional method cannot efficiently analyze whether it is necessary to dispatch a service engineer with respect to another image forming apparatus belonging to the same group as that of the image forming apparatus on which an error has occurred (e.g., an image forming apparatus installed in the same installation location (room) as that of the error-occurring image forming apparatus of the same customer).

Under these circumstances, it is significantly useful and strongly desired by a company that uses an image forming apparatus installed at its business site and another company that provides a service to such a company to reduce maintenance costs including time and money for maintenance. In addition, it is strongly desired by the above-described companies that the dispatch of a service engineer is efficiently executed.

SUMMARY OF THE INVENTION

The present invention is directed to a method for efficiently dispatching a service engineer by appropriately executing a plurality of different analysis functions of a management server.

According to an aspect of the present invention, a management server configured to manage a plurality of image forming apparatuses capable of executing data communication with the management server and to execute processing for dispatching a service engineer with respect to at least one of the plurality of image forming apparatuses includes an acquisition unit configured to acquire operation information and failure information from each of the plurality of image forming apparatuses, a storage unit configured to store the operation information and the failure information about the plurality of image forming apparatuses acquired by the acquisition unit, a first detection unit configured to detect an image forming apparatus that requires the dispatch of a service engineer based on first analysis processing executed by using either one of or both of the operation information and the failure information about the plurality of image forming apparatuses stored on the storage unit, a second detection unit configured to detect an image forming apparatus that requires the dispatch of a service engineer based on second analysis processing, which is different from the first analysis processing, executed by using either one of or both of the operation information and the failure information about the plurality of image forming apparatuses stored on the storage unit in response to the first detection unit having detected the image forming apparatus that requires the dispatch of a service engineer, and an execution unit configured to execute processing for dispatching a service engineer with respect to the image forming apparatuses that have been respectively detected by the first detection unit and the second detection unit, wherein the first analysis processing includes processing for analyzing whether it is required to dispatch a service engineer with respect to a failure occurring on at least one of the plurality of image forming apparatuses, and wherein the second analysis processing includes processing for analyzing whether it is predicted that a failure that requires requesting the dispatch of a service engineer occurs on at least one of the plurality of image forming apparatuses.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to describe the principles of the present invention.

FIG. 4 illustrates a determination criterion used in executing an analysis function of the management server illustrated in FIG. 1 according to an exemplary embodiment of the present invention.

FIG. 5 illustrates a determination criterion used in executing an analysis function of the management server illustrated in FIG. 1 according to an exemplary embodiment of the present invention.

FIGS. 6A and 6B each illustrate an example of a table managed by the management server illustrated in FIG. 1 according to an exemplary embodiment of the present invention.

FIG. 7 illustrates an example of a table stored in the management server illustrated in FIG. 1, which indicates the relationship between each analysis item and the content of a repair request according to an exemplary embodiment of the present invention.

FIG. 9 illustrates an example of a management table managed by the management server illustrated in FIG. 1 according to an exemplary embodiment of the present invention.

FIG. 13 illustrates an example of a user interface displayed by a display unit illustrated in FIG. 1 according to an exemplary embodiment of the present invention.

FIG. 14 illustrates an example of a repair request notification message notified by a communication unit of the management server illustrated in FIG. 3 according to an exemplary embodiment of the present invention.

FIG. 18 illustrates an exemplary memory map of a storage medium storing various data processing programs that can be read by the management server according to an exemplary embodiment of the present invention.

FIG. 19 illustrates an exemplary memory map of a storage medium storing various data processing programs that can be read by the image forming apparatus according to an exemplary embodiment of the present invention.

DETAILED DESCRIPTION OF THE EMBODIMENTS

Various exemplary embodiments, features, and aspects of the present invention will now be herein described in detail below with reference to the drawings. It is to be noted that the relative arrangement of the components, the numerical expressions, and numerical values set forth in these embodiments are not intended to limit the scope of the present invention.

Figure 1:
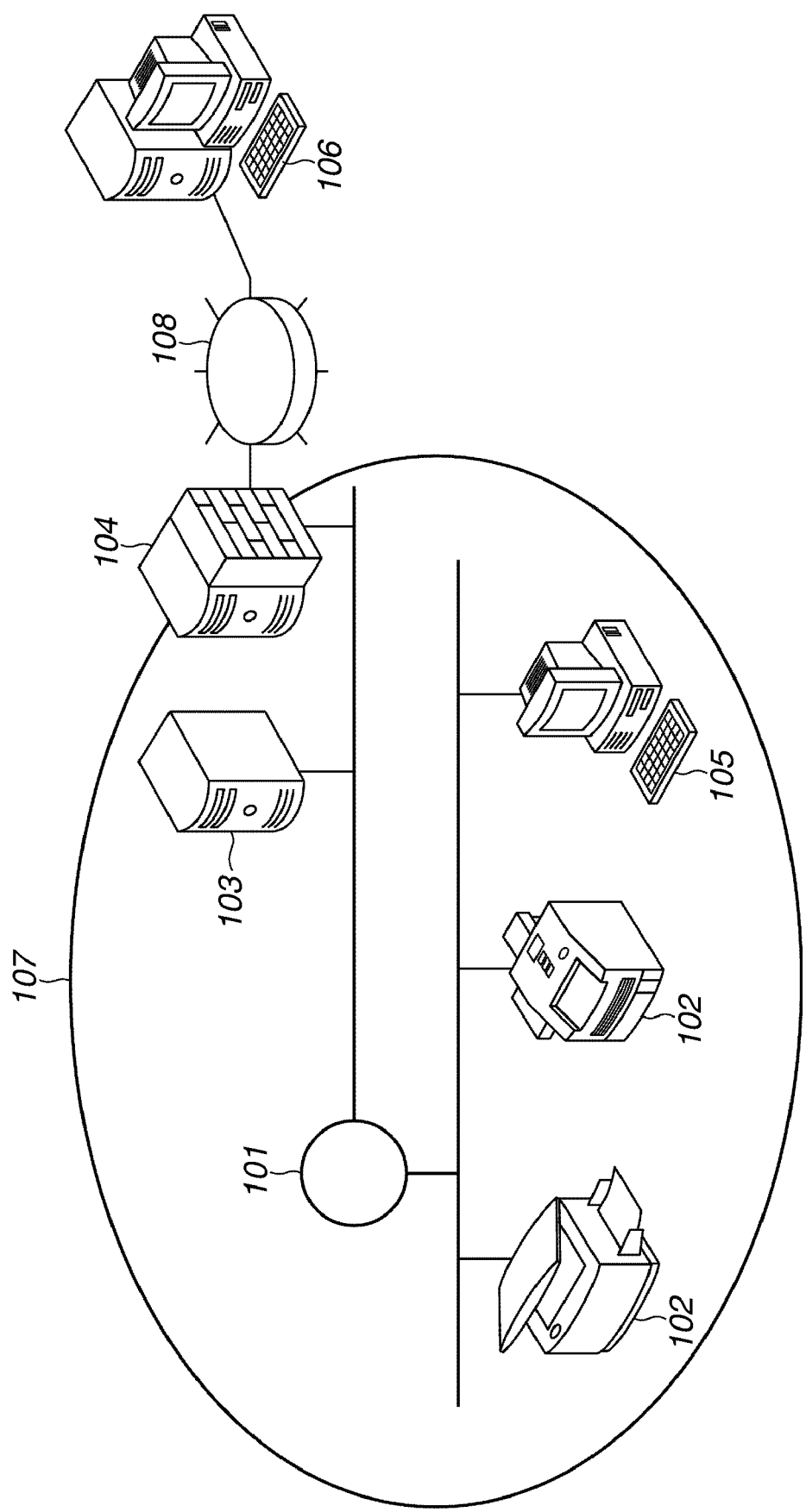
FIG. 1 illustrates an exemplary configuration of a device management system according to an exemplary embodiment of the present invention.

FIG. 1 illustrates an exemplary configuration of a device management system according to a first exemplary embodiment of the present invention. In the example illustrated in FIG. 1, a device management system includes an image forming apparatus and a management server in communication with a network such as the Internet. A multifunction peripheral (MFP) or a printer can be used as the image forming apparatus.

Referring to FIG. 1, a management server 106 can communicate with an image forming apparatus 102 and information processing apparatuses 103 and 104, which are managed by the management server 106, via a local area network (LAN) 101. The information processing apparatus 103 functions as a proxy server, while the information processing apparatus 104 functions as a firewall installed to increase the security level of the Internet 108.

A personal computer (PC) 105 is a computer used by a general user for business operations. The above-described components of the present invention are in communication with one another via the LAN 101.

Furthermore, the management server 106 centrally manages an operation state of a plurality of image forming apparatuses 102 installed within the firewall.

The management server 106 receives an operation mode setting, a counter value, operation information, such as an operation log, and failure information, such as a hardware error and frequent paper jamming, of the image forming apparatus 102 and executes different analysis function processing. The analysis function will be described in detail later below. Furthermore, in executing the above-described analysis function processing, the management server 106 uses either one of or both of the operation information and the failure information.

In an intranet environment 107, the image forming apparatus 102 and the information processing apparatuses 103 and 104 are in communication with one another via the LAN 101. Note here that in an actual device management system, a plurality of intranet environments 107 and the management server 106 are mutually connected via the Internet 108.

The image forming apparatus 102 executes a data communication via the LAN 101 according to a communication schedule set on the image forming apparatus 102. Furthermore, the image forming apparatus 102 converts an operation mode setting, a counter value, operation information such as an operation log, and failure information such as a hardware error and frequent paper jamming with respect to the image forming apparatus 102 into data having a format suitable for communication. In addition, the image forming apparatus 102 transmits the communication data to the management server 106 via the Internet 108.

After receiving the communication data from the image forming apparatus 102, the management server 106 transmits a command (instruction) for updating the setting information and rebooting to the image forming apparatus 102. With respect to a communication method used in this case, the data communication is executed by Management Information Base (MIB) via Simple Network Management Protocol (SNMP).

In the present exemplary embodiment, it is assumed that a protocol such as Hypertext Transport Protocol (HTTP) or Hypertext Transfer Protocol over Secure Socket Layer (HTTPS) is used. However, the present exemplary embodiment is not limited to this.

In the example of the device management system illustrated in FIG. 1, the image forming apparatus 102 transmits data to the management server 106 via the information processing apparatus 103, which functions as a proxy server, and the information processing apparatus 104, which functions as a firewall, using HTTPS.

The management server 106 issues a dedicated command to the image forming apparatus 102 to control the image forming apparatus 102. The image forming apparatus 102 periodically (or based on an instruction from the management server 106) executes processing for acquiring a command (hereinafter referred to as a "command request") to the management server 106. Accordingly, the management server 106 stores the issued command therein until the image forming apparatus 102 actually acquires the command.

With respect to the method for acquiring the command issued from the management server 106, the following method, for example, is used. That is, the image forming apparatus 102 utilizes a Secure Sockets Layer (SSL) certificate stored therein to execute an HTTPS communication with the management server 106. By starting the communication by utilizing a specific SSL certificate, the management server 106 recognizes that the destination of the communication is an image forming apparatus that is a target of the management by the management server 106.

Furthermore, the image forming apparatus 102 includes a monitoring apparatus configured to execute the following communication processing. That is, the monitoring apparatus transmits an identification (ID) previously provided thereto as its unique apparatus identification (ID) to the management server 106 by using a protocol such as Simple Object Access Protocol (SOAP) after the HTTPS communication has been established. Thus, the management server 106 can identify which image forming apparatus 102 has executed the HTTPS communication.

Furthermore, the management server 106 can control a specific image forming apparatus 102 via the Internet 108 by adding a command to data to be transmitted in response to the ID.

Figure 2:
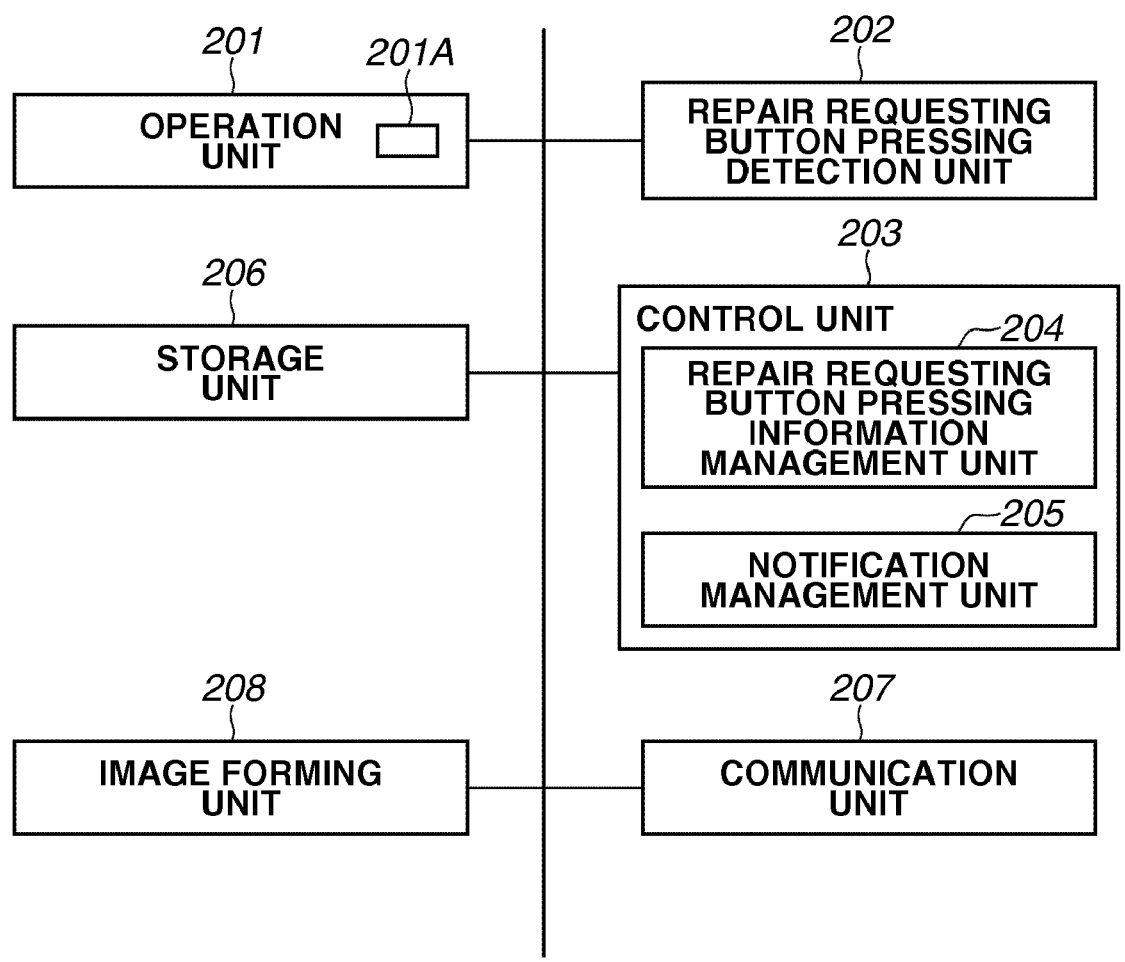
FIG. 2 illustrates an exemplary configuration of an image forming apparatus illustrated in FIG. 1 according to an exemplary embodiment of the present invention.

FIG. 2 illustrates an exemplary configuration of the image forming apparatus 102 illustrated in FIG. 1 according to the present exemplary embodiment.

Referring to FIG. 2, the image forming apparatus 102 includes an operation unit 201, a repair requesting button pressing detection unit 202, a control unit 203, a storage unit 206, a communication unit 207, and a image forming unit 208.

Furthermore, the control unit 203 is constituted by a repair requesting button pressing information management unit 204 for managing repair requesting button pressing information and a notification management unit 205.

The operation unit 201 can display an interface on a display unit 201A. A user can execute and issue an operation and instruction with respect to the image forming apparatus 102, such as a print instruction, via the interface of the operation unit 201. The operation unit 201 includes a repair requesting button on the interface displayed on the display unit 201A. The repair requesting button pressing detection unit 202 detects whether the repair requesting button has been pressed by the user via the interface displayed on the display unit 201A of the operation unit 201. Furthermore, the repair requesting button pressing detection unit 202 notifies the detected repair requesting button pressing state information to the repair requesting button pressing information management unit 204.

The control unit 203 controls print processing executed by the image forming apparatus 102 and manages information about an abnormal state occurring on the image forming apparatus 102. In addition, the control unit 203 manages the repair requesting button pressing state information and notification information.

The repair requesting button pressing information management unit 204 controls an operation of the image forming apparatus 102 executed when the repair requesting button on the interface displayed on the display unit 201A of the operation unit 201 of the image forming apparatus 102 has been pressed.

If it is detected that the above-described repair requesting button has been pressed by the user, then the notification management unit 205 generates notification information and designates a notification destination. The storage unit 206 stores the repair requesting button pressing state information, image forming apparatus information, management apparatus information, another image forming apparatus information and display data of the repair requesting button.

In addition, the storage unit 206 stores an operation history of the image forming apparatus 102 or various data indicating an abnormal state. Image forming apparatus identification information, such as an image forming apparatus ID, and communication information, such as an Internet protocol (IP) address of the image forming apparatus, is included in the image forming apparatus information. Furthermore, the above-described management apparatus information includes communication information, such as the IP address of the management server 106 that manages the image forming apparatus 102.

The communication unit 207 sends and receives the notification data indicating the pressing state of the repair requesting button of the image forming apparatus 102 to and from the management server 106 and another image forming apparatus 102. The notification data is sent and received via an e-mail or a protocol such as HTTP.

The image forming unit 208 has a function for generating print data and outputting the generated print data. It is also useful if a facsimile transmission function or a copying function is included in the image forming apparatus 102.

Figure 3:
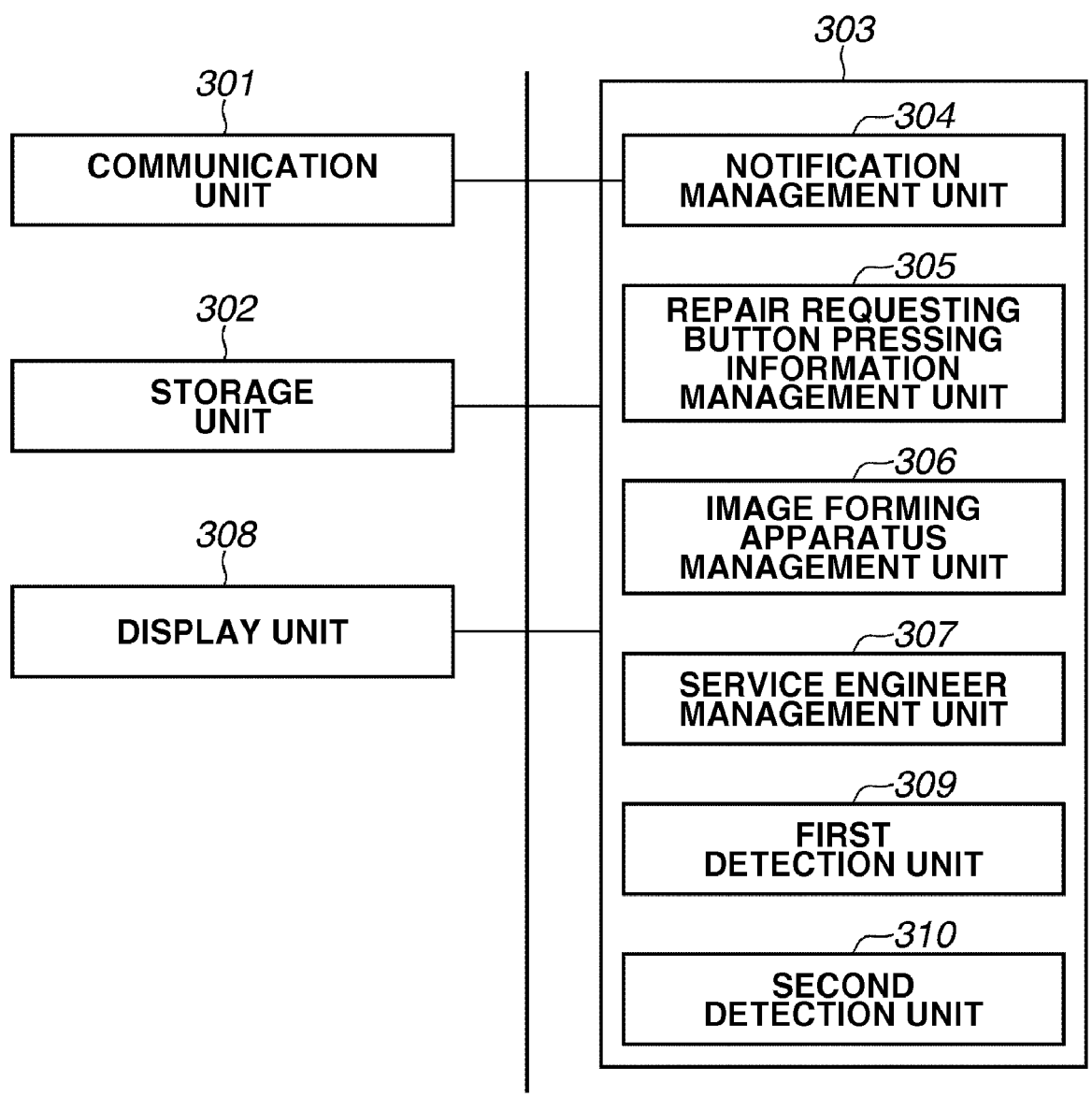
FIG. 3 illustrates an exemplary configuration of a management server illustrated in FIG. 1 according to an exemplary embodiment of the present invention.

FIG. 3 illustrates an exemplary configuration of the management server 106 illustrated in FIG. 1 according to the present exemplary embodiment.

Referring to FIG. 3, the management server 106 includes a communication unit 301, a storage unit 302, and a control unit 303. The communication unit 301 includes a function for executing a communication with the image forming apparatus 102. The communication unit 301 receives the notification data indicating the pressing state of the repair requesting button from the image forming apparatus 102 and transmits a necessary instruction and necessary information to the image forming apparatus 102.

The storage unit 302 stores the image forming apparatus information, the information about the pressing state of the repair requesting button, information about a service engineer, and the notification data. The storage unit 302 is constituted by a non-volatile storage medium, such as an external mass storage device (a hard disk).

The control unit 303 includes a notification management unit 304, a repair requesting button pressing information management unit 305, an image forming apparatus management unit 306, and a service engineer management unit 307. The control unit 303 includes a function for executing control for managing information necessary to monitor and execute a maintenance operation on the image forming apparatus 102.

The notification management unit 304 generates notification information and designates a notification destination to generate notification data including the same. The notification includes a notification for requesting a service engineer in charge of the maintenance of the image forming apparatus 102 to execute a maintenance operation on the image forming apparatus 102 and a notification for requesting the replenishment of consumables on the image forming apparatus 102.

The repair requesting button pressing information management unit 305 manages information about the association between image forming apparatus identification information and repair requesting button pressing state identification information with respect to the image forming apparatus 102 on which the repair requesting button has been pressed by the user.

Note that a plurality of image forming apparatuses 102 is associated with one piece of the repair requesting button pressing state identification information according to the configuration of the device management system. Furthermore, in the case where an effective period is provided to the repair requesting button pressing state detection information, the effective period is also managed.

Furthermore, when the effective period has expired with respect to the repair requesting button pressing state identification information, the repair requesting button pressing information management unit 305 invalidates the association of the repair requesting button pressing state identification information and the image forming apparatus identification information.

The image forming apparatus management unit 306 manages a maintenance target image forming apparatus 102. More specifically, the content of the information managed by the image forming apparatus management unit 306 includes the image forming apparatus identification information, abnormal state information and a maintenance history of the image forming apparatus, image forming apparatus administrator information, and consumables management information with respect to the image forming apparatus 102.

The service engineer management unit 307 manages information about the service engineer in charge of the maintenance of the image forming apparatus 102. More specifically, the service engineer management unit 307 manages contact information about the service engineer, associates the repair requesting button pressing state identification information and the service engineer contact information, and manages service engineer dispatch status information for maintaining the image forming apparatus 102.

In the case where the management server 106 has received a maintenance request notification including the repair requesting button pressing state detection information from a different image forming apparatus, the management server 106 assigns the maintenance of the image forming apparatus to the service engineer who has been previously associated with the received repair requesting button pressing state detection information. With respect to the processing for dispatching a service engineer, various appropriate methods can be used. In this regard, for example, it is useful if the management server 106 automatically issues a request for dispatching a service engineer or if the management server 106 displays an image forming apparatus for which the dispatch of a service engineer is to be requested and an actual request is directly notified to the operator (service engineer) by telephone.

As described above, the management server 106 executes the processing for dispatching a service engineer for the image forming apparatus according to the configuration of the device management system. The above-described service engineer dispatch request method is a mere example and the present exemplary embodiment is not limited to this. That is, any method having the configuration for appropriately dispatching a service engineer as a result of the processing performed according thereto can be used.

A first detection unit 309 executes processing based on an analysis function 1, which will be described in detail later below, extracts the image forming apparatus that requires the dispatch of a service engineer, and executes notification processing for displaying on the extracted image forming apparatus that it is necessary to dispatch a service engineer with respect to the image forming apparatus.

A second detection unit 310 executes processing based on an analysis function 2, which will be described in detail later below, extracts an image forming apparatus that requires the dispatch of a service engineer, and executes notification processing for displaying on the extracted image forming apparatus that it is necessary to dispatch a service engineer with respect to the image forming apparatus.

The processing based on the analysis function 1 is different from the processing based on the analysis function 2. As described above, the present exemplary embodiment includes the above-described two detection units. However, the present exemplary embodiment is not limited to this. That is, it is also useful if the present exemplary embodiment includes only one detection module and the detection module appropriately and separately executes first detection processing and second detection processing.

Furthermore, in the analysis processing based on the analysis functions 1 and 2, analysis function processing is executed by using either one of or both of the operation information and the failure information with respect to a plurality of image forming apparatuses.

In the present exemplary embodiment, operation information illustrated in steps S807 through S811 (FIG. 8) is used as an example of the operation information. However, the present exemplary embodiment is not limited to this. That is, other appropriate information can be used as the operation information.

FIG. 4 illustrates an exemplary determination criterion used in the analysis function of the management server 106 (FIG. 1) according to the present exemplary embodiment. The analysis function of the management server 106 is executed every time the management server 106 receives an alarm or a service call error from the image forming apparatus 102, for example. Furthermore, the analysis function of the management server 106 is executed only on the image forming apparatus 102. The analysis function of the management server 106 described above is hereinafter referred to as the "analysis function 1".

Referring to FIG. 4, an analysis item 401 indicates a function name of the analysis function 1 of the management server 106. A determination criterion 402 corresponds to a determination criterion used in analyzing whether an error has occurred on a target image forming apparatus by using the analysis function 1.

FIG. 5 illustrates an exemplary determination criterion used in the analysis function of the management server 106 illustrated in FIG. 1 according to the present exemplary embodiment. Unlike the analysis function 1 illustrated in FIG. 4, the analysis function of the management server 106 illustrated in FIG. 5 is executed when a user has pressed the repair requesting button on a specific image forming apparatus 102.

In addition, the analysis function of the management server 106 illustrated in FIG. 5 is executed in the case where it has been scheduled to dispatch a service engineer in such an occasion of a periodical check of the image forming apparatus 102 or if an error has occurred on the image forming apparatus 102. Furthermore, the analysis function of the management server 106 illustrated in FIG. 5 is executed on all the image forming apparatuses 102 belonging to the same group as that of the image forming apparatus 102 on which the user has pressed the repair requesting button, not only with respect to the image forming apparatus 102 whose repair requesting button has been pressed. Hereinbelow, the analysis function based on the above-described operations is referred to as the "analysis function 2".

The analysis function 2 is executed based on the information stored on the management server 106 (an alarm, a service call error, and the operation information, such as a counter value). More specifically, in the analysis function 2, history information about errors and failures that have occurred so far on a plurality of image forming apparatuses are stored and analyzed. Furthermore, in the analysis function 2, error and failure prediction processing is empirically executed with a high accuracy uniquely with respect to each product and part. However, the processing by the analysis function 2 is more specific and detailed than that by the analysis function 1. Accordingly, the processing load in the case of the analysis function 2 becomes higher than that in the case of the analysis function 1.

Referring to FIG. 5, the analysis item 501 indicates a function name of the analysis function 2 of the management server 106. A determination criterion 502 corresponds to a determination criterion used in analyzing whether an error or a failure may occur on the target image forming apparatus 102 in the future by using the analysis function 2.

The analysis function 1 illustrated in FIG. 4 and the analysis function 2 illustrated in FIG. 5 according to the present exemplary embodiment will be described in more detail below.

The analysis function 1 illustrated in FIG. 4 is a function for securely analyzing a failure or an error, which is executed in the case where it has been actually recognized that a failure or an error has occurred on a specific image forming apparatus 102 based on a notification transmitted therefrom. On the other hand, in the analysis function 2 illustrated in FIG. 5, an error or a failure that may occur on a specific image forming apparatus 102 in the future is predicted by executing a specific analysis with a high accuracy. However, the result of the analysis function 2 illustrated in FIG. 5 is a mere prediction. Furthermore, a specific detailed analysis may become necessary to execute the analysis function 2.

Therefore, in the case where a service engineer has been dispatched to a customer's environment based only on a result of the failure prediction by the analysis function 2 illustrated in FIG. 5, the dispatch of a service engineer may become unnecessary if the predicted error has not actually occurred. Furthermore, the processing load on the management server 106 may increase by executing a specific analysis in addition to the normal failure prediction illustrated in FIG. 4.

That is, it is significant and useful in the present exemplary embodiment to execute the maintenance on the image forming apparatus in a customer's environment by executing the highly accurate error prediction illustrated in FIG. 5 at an optimum timing without increasing the cost for dispatching a service engineer.

FIGS. 6A and 6B each illustrate an example of a table managed by the management server 106 illustrated in FIG. 1 according to the present exemplary embodiment. FIG. 6A corresponds to a table TB1 indicating registration information on the image forming apparatus 102, while FIG. 6B corresponds to the table TB2 indicating the relationship between the image forming apparatus 102 and a repair request. Each of the tables TB1 and TB2 is stored on the storage unit 302 of the management server 106.

Referring to FIGS. 6A and 6B, an image forming apparatus ID field 601 manages the ID for identifying the image forming apparatus 102 registered on the management server 106. A customer name field 602 manages the owner or the user (customer) of the image forming apparatus 102 with respect to each image forming apparatus ID 601.

An installation location field 603 manages the installation location of the image forming apparatus 102 with respect to each image forming apparatus ID 601. An image forming apparatus ID field 604 manages an image forming apparatus 102 extracted by the management server 106 as an analysis target.

A repair request field 605 manages information indicating whether it is necessary to issue a repair request as a result of the analysis by the analysis function 2 with respect to each image forming apparatus 102. In the example illustrated in FIG. 6B, a circle mark "○" indicates that a repair is necessary. A repair request description field 606 manages the content of a repair request in the case where it is necessary to issue a repair request with respect to the image forming apparatus 102.

FIG. 7 illustrates an example of a table TB3 indicating the relationship between an analysis item and the content of a repair request included in the management server 106 illustrated in FIG. 1. The table TB3 is stored on the storage unit 302 of the management server 106.

Referring to FIG. 7, an analysis item 701 corresponds to the above-described analysis function 2. A repair request description 702 indicates the content of a repair request in the case where it has been determined that it is necessary to issue a repair request as a result of an analysis by the analysis function 2.

Figure 8:
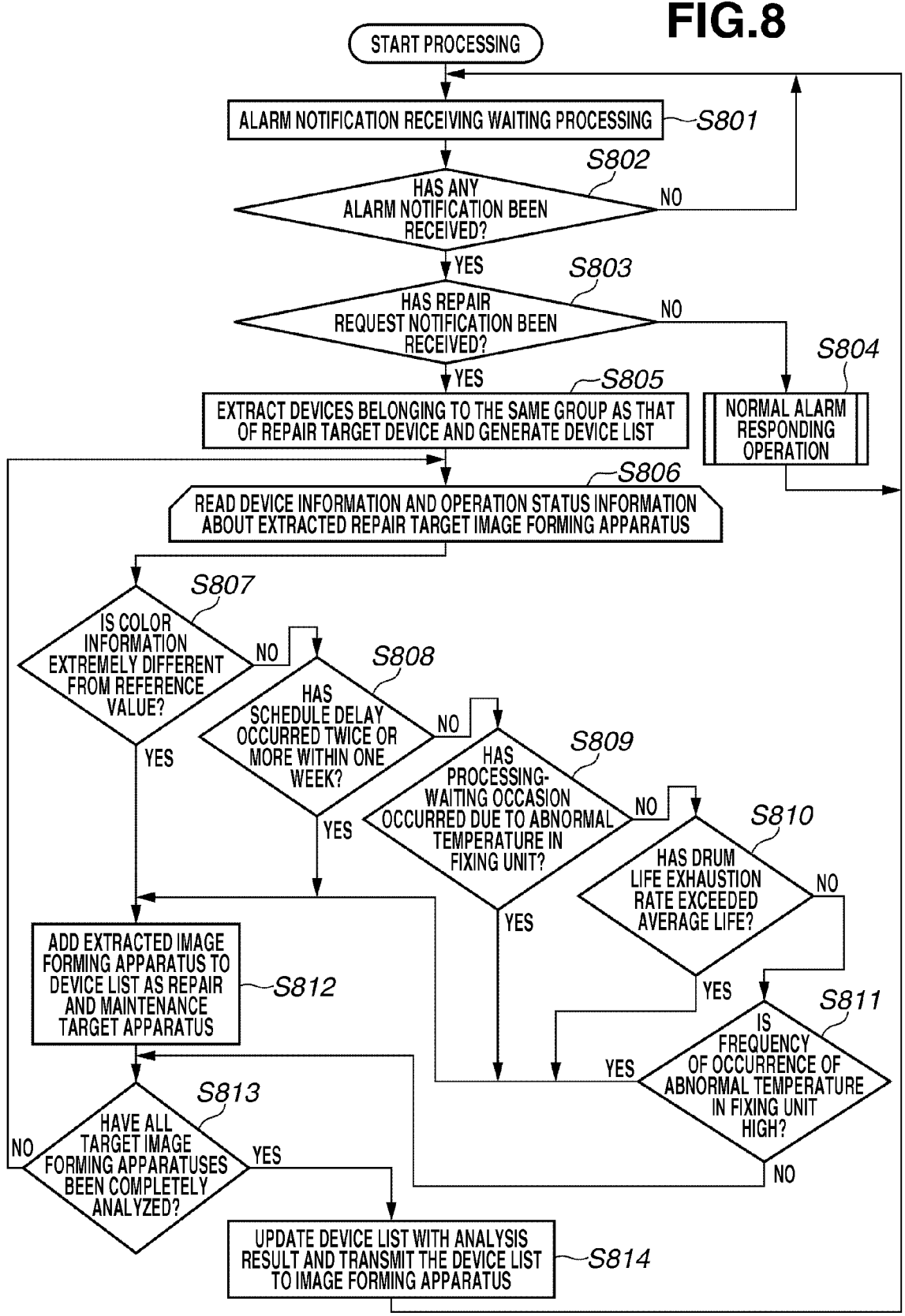
FIG. 8 is a flow chart illustrating an example of data processing executed by the management server according to an exemplary embodiment of the present invention.

FIG. 8 is a flow chart illustrating an example of data processing executed by the management server 106 according to the present exemplary embodiment. The exemplary analysis processing illustrated in FIG. 8 is executed by the management server 106 illustrated in FIG. 1. Each step in the flow chart in FIG. 8 is implemented by the control unit 303 of the management server 106 by executing a corresponding control program.

Referring to FIG. 8, in step S801, the control unit 303 of the management server 106 executes alarm receiving waiting processing. More specifically, in step S801, the control unit 303 waits until an alarm notification is received from a specific image forming apparatuses 102 in the device management system (FIG. 1) via the communication unit 301.

In step S802, the control unit 303 determines whether the notification received from a specific image forming apparatuses 102 in step S801 is an alarm notification. If it is determined by the control unit 303 in step S802 that the notification from the image forming apparatus 102 is the alarm notification (YES in step S802), then the processing advances to step S803.

In step S803, the control unit 303 determines whether the received alarm notification is a repair request notification issued based on the pressing of the repair requesting button.

On the other hand, if it is determined in step S802 that the notification from the image forming apparatus 102 is not an alarm notification (NO in step S802), then the processing returns to step S801. In step S801, the control unit 303 repeats the alarm notification receiving waiting processing.

If it is determined by the control unit 303 in step S803 that the received alarm notification is a repair request notification issued based on the pressing of the repair requesting button (YES in step S803), then the processing advances to step S805.

In step S805, the control unit 303 extracts a device belonging to the same group as that of the image forming apparatus 102 on which the repair requesting button has been pressed by the user. Furthermore, the control unit 303 generates a list of the extracted devices. Here, the determination as to whether the extraction target device belongs to the same group as that of the image forming apparatus 102 on which the repair requesting button has been pressed by the user is executed based on information about the image forming apparatus 102 registered on the management server 106.

Furthermore, the information about the image forming apparatus 102 includes information about a sales organization to which the image forming apparatus 102 belongs, information about the owner (customer) of the image forming apparatus 102, and the installation location information of the image forming apparatus 102.

In the present exemplary embodiment, as illustrated in FIG. 6B, the repair requesting button has been pressed on the image forming apparatus ID "DEV0000000002", whose repair request content 606 is "image failure". Here, "DEV0000000001", "DEV0000000003", "DEV0000000004", and "DEV0000000005" are identified as the image forming apparatuses 102 that belong to the same group as that of "DEV0000000002" based on the customer name and the installation location included in the table TB1 (FIG. 6A).

Note that in the example illustrated in FIG. 6A, the identified image forming apparatus is indicated in a shaded state so that the identified image forming apparatus can be easily distinguished from the other image forming apparatuses.

On the other hand, if it is determined in step S803 that the received alarm notification is not a repair request notification issued based on the pressing of the repair requesting button (NO in step S803), then the processing advances to step S804.

In step S804, the control unit 303 executes normal alarm processing. Then, the processing returns to step S801. In step S801, the control unit 303 repeats the alarm notification receiving waiting processing for waiting until an alarm notification is received from the image forming apparatus 102. The normal alarm the processing refers to the processing illustrated in FIG. 4, for example.

In step S806, the control unit 303 reads the operation information about the image forming apparatus 102 extracted in step S605 from the storage unit 302. After that, the control unit 303 executes the analysis processing based on the analysis function 2 in steps S807 through S811.

More specifically, in step S807, the control unit 303 determines whether the color information in the analysis item 701 is extremely different from a reference value. If it is determined by the control unit 303 in step S807 that the color information in the analysis item 701 is extremely different from a reference value (YES in step S807), then the processing advances to step S812. In step S812, the control unit 303 updates the device list stored on the management server 106 by adding the image forming apparatus 102 to the device list as a repair and maintenance target image forming apparatus.

On the other hand, if it is determined by the control unit 303 in step S807 that the color information in the analysis item 701 is not extremely different from a reference value (NO in step S807), then the processing advances to step S808. In step S808, the control unit 303, with respect to a subsequent analysis item 701, determines whether schedule transmission delay occasions have occurred twice or more within one week.

If it is determined by the control unit 303 in step S808 that schedule transmission delay occasions have occurred twice or more within one week (YES in step S808), then the processing advances to step S812. In step S812, the control unit 303 updates the device list stored on the management server 106 by adding the image forming apparatus 102 to the device list as a repair and maintenance target image forming apparatus.

On the other hand, if it is determined by the control unit 303 in step S808 that schedule transmission delay occasions of twice or more within one week have not occurred (NO in step S808), then the processing advances to step S809. In step S809, the control unit 303 determines whether an occasion of waiting for starting processing of a job has occurred due to the phenomenon of abnormal temperature in the fixing device. If it is determined by the control unit 303 in step S809 that an occasion of waiting for starting the processing of a job has occurred due to the phenomenon of abnormal temperature in the fixing device (YES in step S809), then the processing advances to step S812. In step S812, the control unit 303 updates the device list stored on the management server 106 by adding the image forming apparatus 102 to the device list as a repair and maintenance target image forming apparatus.

On the other hand, if it is determined by the control unit 303 in step S809 that no occasion of waiting for starting job processing has occurred due to the phenomenon of abnormal temperature in the fixing device (NO in step S809), then the processing advances to step S810. In step S810, the control unit 303 determines whether a drum life exhaustion rate has exceeded an average life of each drum model.

If it is determined by the control unit 303 in step S810 that the drum life exhaustion rate has exceeded the average life of each drum model (YES in step S810), then the processing advances to step S812. In step S812, the control unit 303 updates the device list stored on the management server 106 by adding the image forming apparatus 102 to the device list as a repair and maintenance target image forming apparatus.

On the other hand, if it is determined by the control unit 303 in step S810 that the drum life exhaustion rate has not exceeded the average life of each drum model (NO in step S810), then the processing advances to step S811. In step S811, the control unit 303 determines whether the frequency of occurrence of the phenomenon of fixing device abnormal temperature is high.

If it is determined by the control unit 303 in step S811 that the frequency of occurrence of the phenomenon of fixing device abnormal temperature is high (YES in step S811), then the processing advances to step S812. In step S812, the control unit 303 updates the device list stored on the management server 106 by adding the image forming apparatus 102 to the device list as a repair and maintenance target image forming apparatus.

On the other hand, if it is determined by the control unit 303 in step S811 that the frequency of occurrence of the phenomenon of fixing device abnormal temperature is not high (NO in step S811), then the processing advances to step S813. In step S813, the control unit 303 determines whether all of the image forming apparatuses extracted in step S805 have been completely analyzed by using the analysis function 2. If it is determined in step S813 that not all of the image forming apparatuses extracted in step S805 have been completely analyzed by using the analysis function 2 (NO in step S813), then the processing returns to step S806. In step S806, the control unit 303 reads the operation information about the next image forming apparatus 102 extracted in step S605 from the storage unit 302.

On the other hand, if it is determined in step S813 that all of the image forming apparatuses extracted in step S805 have been completely analyzed by using the analysis function 2 (YES in step S813), then the processing advances to step S814. In step S814, the control unit 303 transmits the device list updated with the analysis result in step S812 to the image forming apparatus 102. Then, the processing ends.

In the present exemplary embodiment, first analysis processing executed by using the analysis function 1 and second analysis processing executed by using the analysis function 2 are different from each other. However, the present exemplary embodiment is not limited to this. That is, it is also useful if the first detection unit 309 and the second detection unit 310 are implemented with the same software module.

FIG. 9 illustrates an example of a management table managed by the management server 106 illustrated in FIG. 1 according to the present exemplary embodiment. The management table illustrated in FIG. 8 indicates the relationship between the image forming apparatus 102 and the repair request, which table is updated with the analysis result based on the analysis function 2 after the processing illustrated in FIG. 8 is executed. The table is stored on the storage unit 302 of the management server 106.

Referring to FIG. 9, a device ID column 901 stores information for identifying the image forming apparatus 102 extracted by the management server 106 as the analysis target. A repair request column 902 stores a result of an analysis by the analysis function 2 with respect to each image forming apparatus 102 as to whether it is necessary to issue a repair request. In the present exemplary embodiment, after having received a repair request from one image forming apparatus, it is determined that it is necessary to issue a repair request with respect to other image forming apparatuses. As a result, three image forming apparatuses have been registered as repair target image forming apparatuses in total.

A repair request description column 903 stores the content of a repair request identified with respect to each image forming apparatus.

In the present exemplary embodiment, the schedule transmission delay has occurred twice or more within a week with respect to the image forming apparatus whose device ID is "DEV0000000003". Accordingly, with respect to the image forming apparatus whose device ID is "DEV0000000003", it is predicted that a specific error occurs. In this case, the image forming apparatus whose device ID is "DEV0000000003" becomes the target of the repair request. Furthermore, the content of the repair request issued with respect to the image forming apparatus whose device ID is "DEV0000000003" is "communication failure" as indicated in the analysis item column "repair request description" in FIG. 7.

Furthermore, with respect to the image forming apparatus whose device ID is "DEV0000000005", as a result of an analysis of a sub log, the occasion of processing delay has occurred due to the phenomenon of abnormal temperature in the fixing device. Accordingly, in this case, the image forming apparatus whose device ID is "DEV0000000005" becomes the target of the repair request. Furthermore, the content of the repair request issued with respect to the image forming apparatus whose device ID is "DEV0000000005" is "other failures" as indicated in the analysis item column "repair request description" in FIG. 7. The example illustrated in FIG. 9 indicates the device list updated with the results of the above-described analysis.

In step S814, the management server 106 transmits the device list illustrated in FIG. 9 that has been updated with the above-described analysis results to the image forming apparatus whose device ID is "DEV0000000002" on which the repair requesting button has been pressed by the user.

Figure 10:
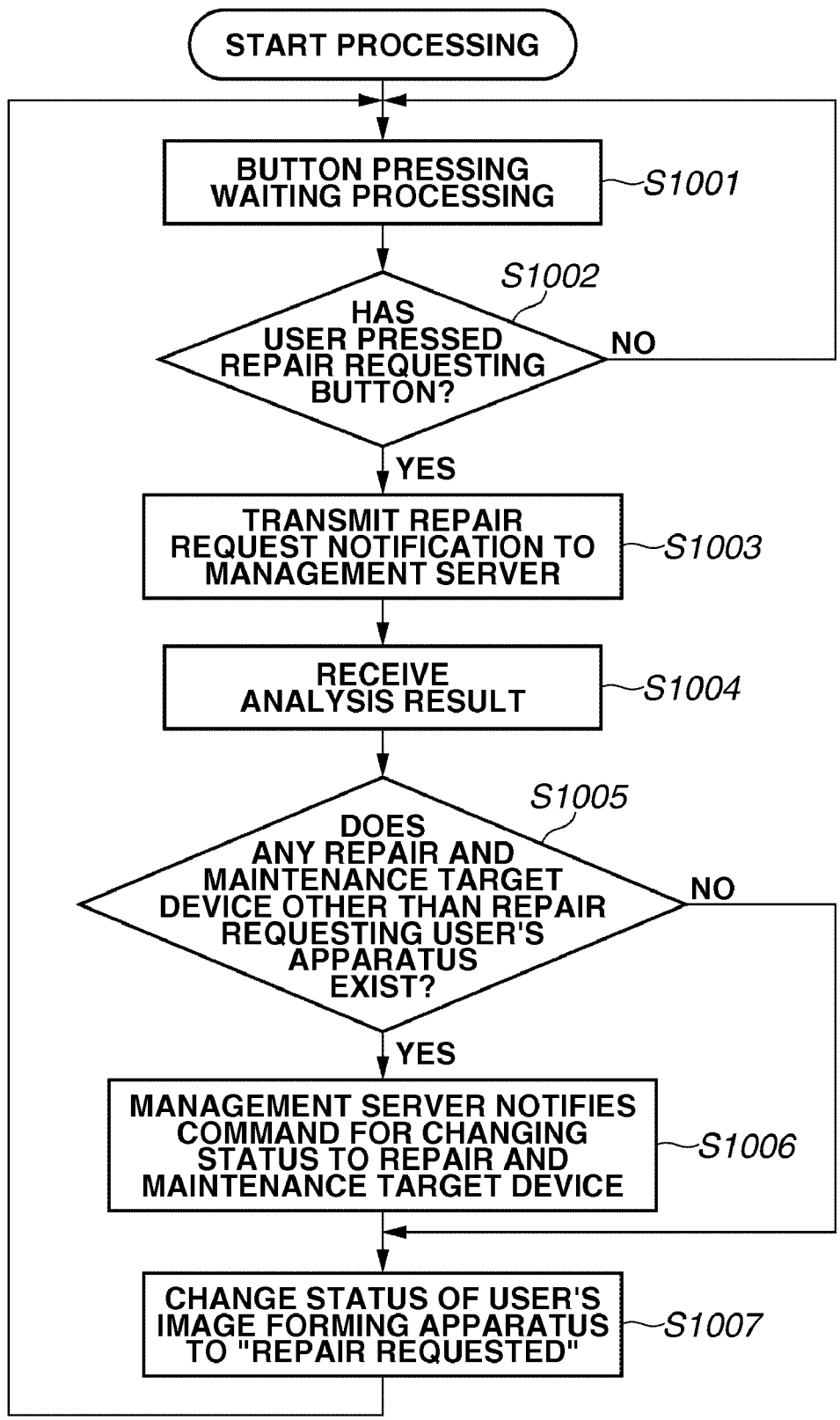
FIG. 10 is a flow chart illustrating an example of data processing executed by the image forming apparatus according to an exemplary embodiment of the present invention.

FIG. 10 is a flow chart illustrating an example of data processing executed by the image forming apparatus according to an exemplary embodiment of the present invention. In the example FIG. 10, an exemplary processing for communicating with the management server 106 is illustrated. Each step thereof is executed by the repair requesting button pressing information management unit 204 and the notification management unit 205 of the control unit 203.

Note that a plurality of image forming apparatuses 102 exists in the device management system illustrated in FIG. 1. Each of the plurality of image forming apparatuses executes the processing illustrated in FIG. 10.

Referring to FIG. 10, in step S1001, the control unit 203 executes button pressing waiting processing and determines whether any button has been pressed by the user. If it is determined by the control unit 203 in step S1001 that the user has pressed a button, then the processing advances to step S1002.

In step S1002, the control unit 203 determines whether the repair requesting button has been pressed by the user. If it is determined by the control unit 203 in step S1002 that the repair requesting button has been pressed (YES in step S1002), then the processing advances to step S1003. In step S1003, the control unit 203 notifies information indicating that the repair requesting button has been pressed to the management server 106. Then, the processing illustrated in FIG. 8 is executed by the management server 106.

On the other hand, if it is determined by the control unit 203 in step S1002 that the repair requesting button has not been pressed (NO in step S1002), then the processing returns to step S1001. In step S1001, the control unit 203 repeats the button pressing waiting processing.

In step S1004, the control unit 203 receives an analysis result transmitted from the management server 106. In step S1005, the control unit 203 determines whether any repair and maintenance request target image forming apparatus 102 exists other than the image forming apparatus 102 itself according to the received analysis result including the list of image forming apparatuses 102.

If it is determined by the control unit 203 in step S1005 that any other and maintenance target image forming apparatus exists (YES in step S1005), then the processing advances to step S1006. In step S1006, the control unit 203 notifies the repair and maintenance request target image forming apparatus 102 that the image forming apparatus 102 is the repair and maintenance request target via the communication unit 207. The notification includes an instruction for changing the status of the image forming apparatus 102 to "repair requesting button pressed".

On the other hand, if it is determined by the control unit 203 in step S1005 that no other and maintenance request target image forming apparatus exists (NO in step S1005), then the processing advances to step S1007. In step S1007, the control unit 203 changes the status of the image forming apparatus 102 managed therein and stored on the storage unit 206 to "repair requested". Then, the processing returns to step S1001. In step S1001, the control unit 203 repeats the button pressing waiting processing.

In the present exemplary embodiment, as described above, the repair requesting button is pressed by the user on the image forming apparatus whose image forming apparatus ID is "DEV0000000002". Then, it is notified to the management server 106 that the repair requesting button has been pressed by the user on the image forming apparatus whose image forming apparatus ID is "DEV0000000002". Then, the processing based on the analysis function 2 of the management server 106 illustrated in FIG. 8 is executed. Then, the control unit 203 receives the list that has been updated with the analysis result (FIG. 9).

As a result, it is determined in step S1005 that the devices that are the targets of the repair request exist other than the image forming apparatus 102 itself. Accordingly, according to the analysis result received from the management server 106 in step S1006, the image forming apparatus whose image forming apparatus ID is "DEV0000000003" and the image forming apparatus whose image forming apparatus ID is "DEV0000000005" are set as the repair request target image forming apparatuses.

Accordingly, the control unit 203 changes the status of two image forming apparatuses 102, namely, the image forming apparatuses having the image forming apparatus IDs "DEV0000000003" and "DEV0000000005" to "repair requested". Furthermore, the management server 106 issues an instruction to the image forming apparatus whose image forming apparatus ID is "DEV0000000003" for changing the content of the repair request to "communication failure". In the same way, the management server 106 issues an instruction to the image forming apparatus whose image forming apparatus ID is "DEV0000000005" for changing the content of the repair request to "other failures". The instruction is issued by notifying a command for changing the device status of each image forming apparatus thereto. In addition, the image forming apparatus whose image forming apparatus ID is "DEV0000000002" changes the status of the image forming apparatus 102 itself to "repair requested".

Figure 11:
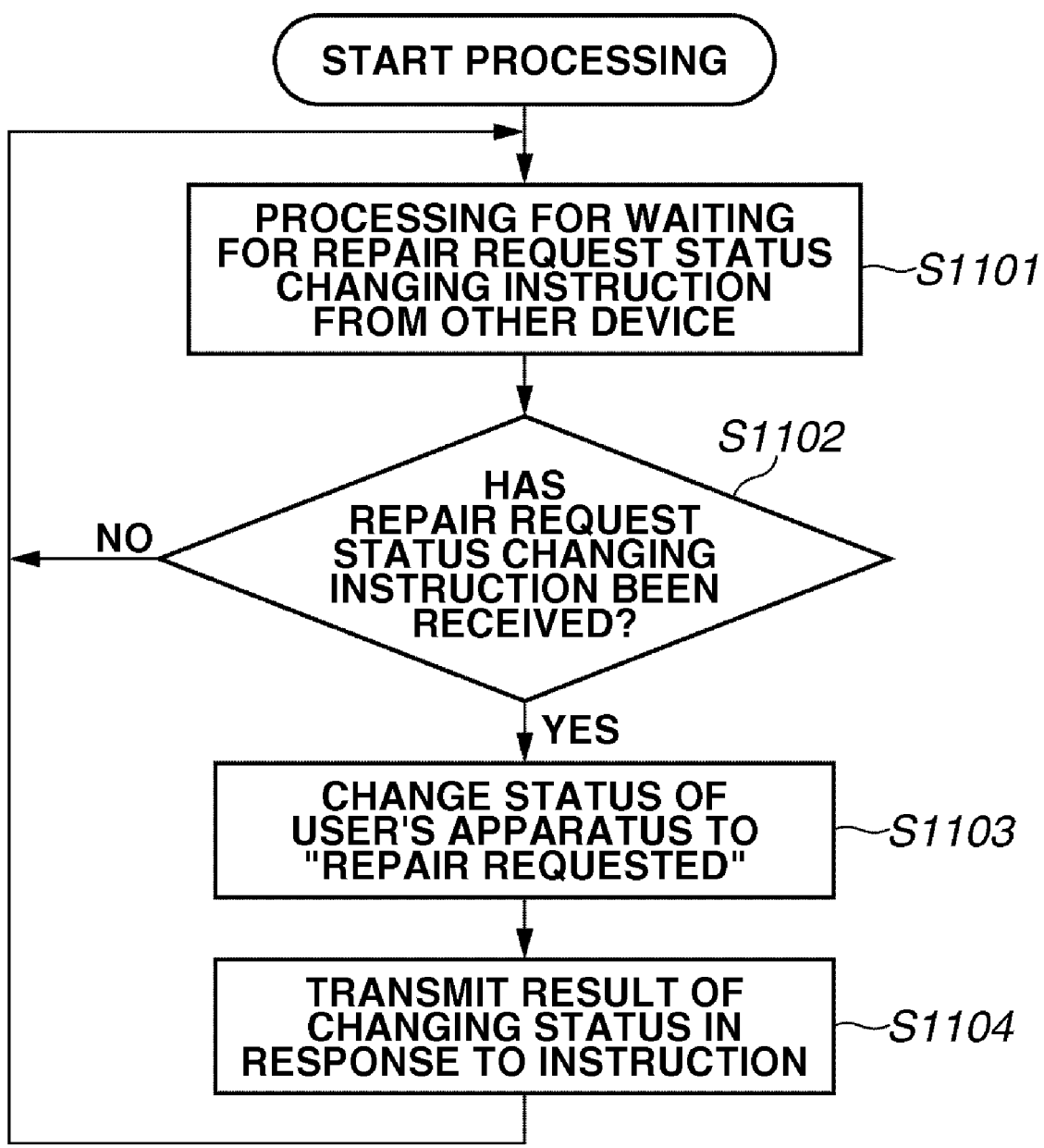
FIG. 11 is a flow chart illustrating an example of data processing executed by the image forming apparatus according to an exemplary embodiment of the present invention.

FIG. 11 is a flow chart illustrating an example of data processing executed by the image forming apparatus according to an exemplary embodiment of the present invention. In the example in FIG. 11, processing to be executed in the case where the image forming apparatus 102 has received an instruction from another image forming apparatus 102 is illustrated. Each step is executed by the repair requesting button pressing information management unit 204 and the notification management unit 205 of the control unit 203.

Note that a plurality of image forming apparatuses 102 exists in the device management system illustrated in FIG. 1. Each of the plurality of image forming apparatuses executes the processing illustrated in FIG. 11. Furthermore, in the present exemplary embodiment, according to the device list illustrated in FIG. 9, the image forming apparatus whose image forming apparatus ID is "DEV0000000002" transmits the instruction for changing the repair request status to the image forming apparatuses having the image forming apparatus IDs "DEV0000000005" and "DEV0000000003".

Referring to FIG. 11, in step S1101, the control unit 203 executes processing for waiting for receiving an instruction issued from another image forming apparatus 102 via the communication unit 207 and determines whether any instruction has been received from another image forming apparatus 102. When the control unit 203 receives an instruction issued from another image forming apparatus 102, the processing advances to step S1102. In step S1102, the control unit 203 determines whether the received instruction is the instruction for changing the repair request status.

If it is determined by the control unit 203 in step S1102 that the instruction received from another image forming apparatus 102 in step S1101 is the instruction for changing the repair request status (YES in step S1102), then the processing advances to step S1103. In step S1103, the control unit 203 changes the status of the image forming apparatus 102 itself managed therein and stored on the storage unit 206 to "repair requested".

On the other hand, if it is determined by the control unit 203 in step S1102 that the instruction received from another image forming apparatus 102 is not the instruction for changing the repair request status (NO in step S1102), then the processing returns to step S1101. In step S1101, the control unit 203 repeats the processing for waiting for receiving an instruction from another image forming apparatus 102.

In step S1104, the control unit 203 transmits the result of the change in the repair request status executed in step S1103 (OK/NG) to the image forming apparatus to which the instruction for changing the repair request status has been issued via the communication unit 207 in response to the repair request issued in step S1103. Then, the processing returns to step S1101. In step S1101, the control unit 203 repeats the processing for waiting for receiving an instruction from another image forming apparatus 102.

In the present exemplary embodiment, the image forming apparatuses having the image forming apparatus IDs "DEV0000000003" and "DEV0000000005" change the repair request status to "repair requested" according to the instruction for changing the repair request status received from the image forming apparatus whose device ID is "DEV0000000002". In addition, the image forming apparatuses having the image forming apparatus IDs "DEV0000000003" and "DEV0000000005" change the content of the repair request to "communication failure" and "other failures". Then, the image forming apparatuses having the image forming apparatus IDs "DEV0000000003" and "DEV0000000005" transmit the result of the change indicating that the change has been normally and successfully applied to the image forming apparatus whose device ID is "DEV0000000002".

Figure 12:
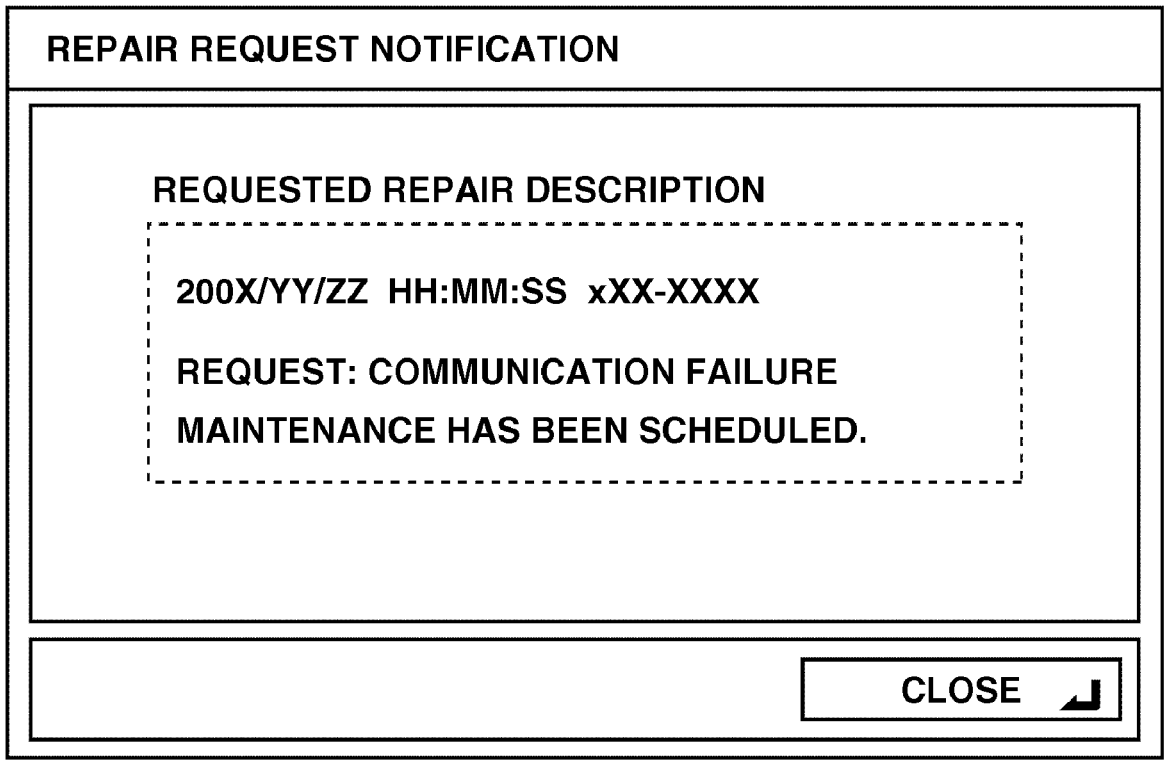
FIG. 12 illustrates an example of a user interface displayed by a display unit of an operation unit illustrated in FIG. 2 according to an exemplary embodiment of the present invention.

FIG. 12 illustrates an example of a user interface displayed on the display unit 201A of the operation unit 201 illustrated in FIG. 2 according to the present exemplary embodiment. In the example in FIG. 12, an example of a panel display displayed in the case where the repair request status with respect to the image forming apparatus 102 has been changed according to the result of the analysis executed by the management server 106 is illustrated.

In the present exemplary embodiment, the repair request status of the image forming apparatus whose device ID is "DEV0000000003" is "repair requested". The content of the repair request is "communication failure".

FIG. 13 illustrates an example of a user interface displayed to the display unit 308 illustrated in FIG. 1 according to the present exemplary embodiment. In the example illustrated in FIG. 13, the analysis result acquired after executing the processing illustrated in FIG. 8 is displayed on the display panel as a detailed report.

In the present exemplary embodiment, when the repair requesting button has been pressed by the user on the image forming apparatus whose image forming apparatus ID is "DEV0000000002", the control unit 303 executes the analysis processing illustrated in FIG. 8. The control unit 303 displays a notification message indicating that the image forming apparatuses having the image forming apparatus IDs "DEV0000000003" and "DEV0000000005" have become the targets of the repair request as a result of the analysis.

FIG. 14 illustrates an example of a repair request notification message notified from the communication unit 301 of the management server 106 illustrated in FIG. 3 according to the present exemplary embodiment.

More specifically, the example in FIG. 14 illustrates an example of a repair request notification to be transmitted to a sales company or a system administrator at a customer's business site after the management server 106 has executed with the analysis processing illustrated in FIG. 8.

In the present exemplary embodiment, it is notified to the user that the repair requesting button has been pressed on the image forming apparatus whose image forming apparatus ID is "DEV0000000002". In addition, it is notified to the user that the image forming apparatuses having the image forming apparatus IDs "DEV0000000003" and "DEV0000000005" have become the targets of the repair request as a result of the analysis processing executed by the management server 106 illustrated in FIG. 8.

Note that the control unit 303 can identify a destination of the notification by referring to a management table storing information for identifying the notification destination with respect to each image forming apparatus. The management table is stored on the storage unit 302 of the management server 106, for example.

The first exemplary embodiment of the present invention has the above-described configuration and control configuration and stores the above-described information table. In addition, the management server 106 and the image forming apparatus 102 execute the above-described processing according to the processing flow described in detail above. However, the above-described configurations are mere examples and do not limit the scope of an exemplary embodiment of the present invention.

Note that the repair requesting button included in the operation unit 201 of the image forming apparatus 102 is pressed by the user to notify the repair request, which indicates that it is necessary to execute processing and operation for dispatching a service engineer with respect to the failure, to the management server 106.

In the above-described first exemplary embodiment, the management server 106 notifies the result of the analysis executed by the analysis function 2 during the analysis processing based on the analysis function 2 (FIG. 8) to only the image forming apparatus 102 on which the user has pressed the repair requesting button. However, it is also useful if the result of the analysis executed by the management server 106 by using the analysis function 2 is notified to the image forming apparatus 102 on which the user has pressed the repair requesting button and to other repair request target image forming apparatuses identified in the analysis processing executed by using the analysis function 2.

Now, a second exemplary embodiment of the present invention will be described in detail below. In the present exemplary embodiment, the management server 106 notifies the result of the analysis processing directly to all repair request target image forming apparatuses 102.

Figure 15:
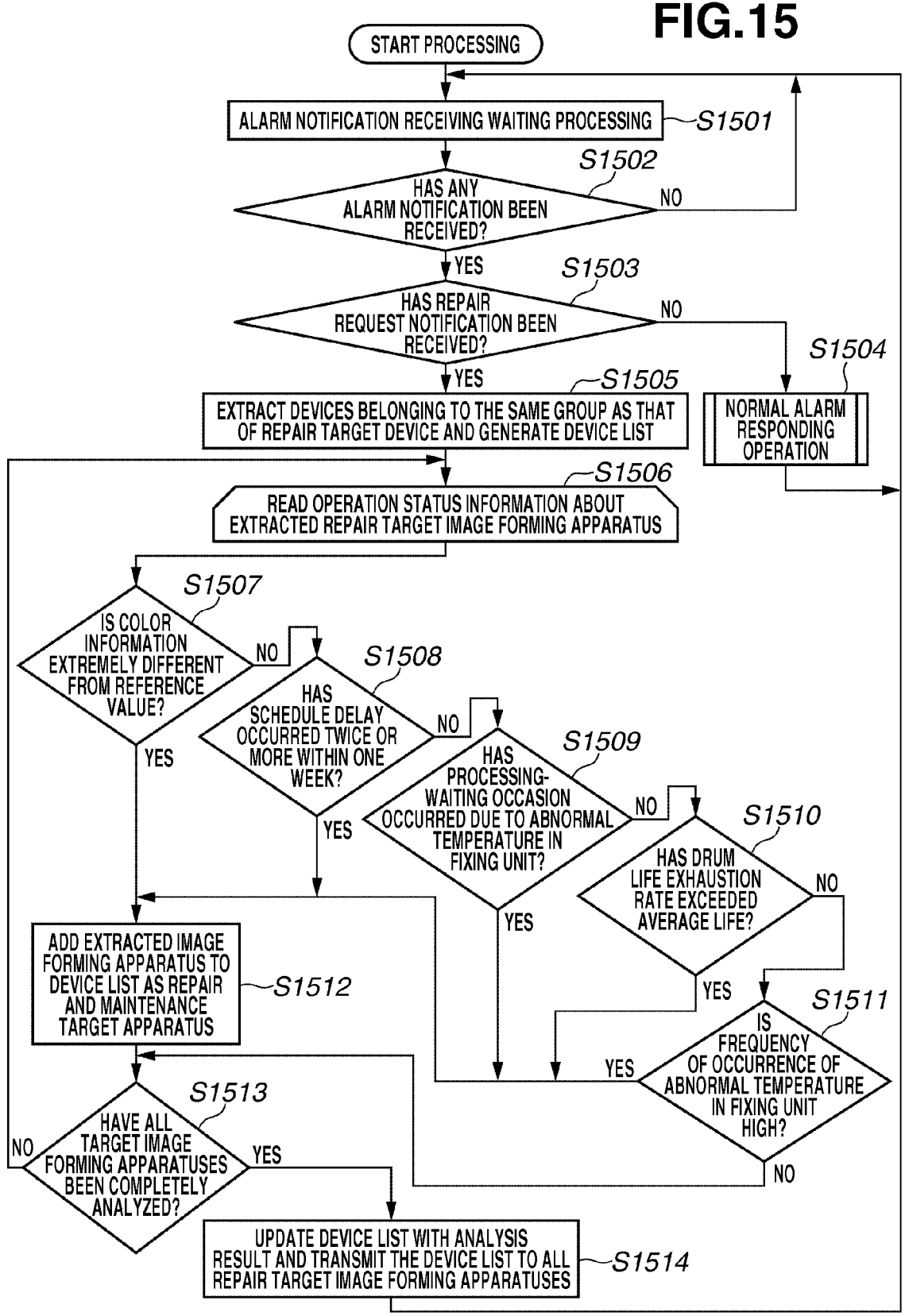
FIG. 15 is a flow chart illustrating an example of data processing executed by the management server according to an exemplary embodiment of the present invention.

FIG. 15 is a flow chart illustrating an example of data processing executed by the management server according to the present exemplary embodiment. In the example illustrated in FIG. 15, the management server 106 illustrated in FIG. 1 executes the analysis processing. Each step is implemented with the control unit 303 of the management server 106 by reading and executing a control program for the analysis processing.

Furthermore, processing in steps S1501 through S1512 is similar to that executed in steps S801 through S812 (FIG. 8). Therefore, the detailed description thereof will not be repeated here.

Referring to FIG. 15, in step S1513, the control unit 303 determines whether all of the image forming apparatuses have been completely analyzed based on the analysis function 2. If it is determined by the control unit 303 in step S1513 that all of the image forming apparatuses have been completely analyzed based on the analysis function 2 (YES in step S1513), then the processing advances to step S1514. In step S1514, the control unit 303 transmits the list that has been updated with the analysis result to all of the image forming apparatuses that have been registered as repair request target devices. Then, the processing ends.

In the present exemplary embodiment, the control unit 303 issues an instruction for changing the repair request status to "repair requested" and setting the repair request contents "communication failure" and "other failures" to the image forming apparatuses having the image forming apparatus IDs "DEV0000000003" and "DEV0000000005", respectively. In addition, the control unit 303 issues an instruction for changing the status of the repair request to "repair requested" to the image forming apparatus whose image forming apparatus ID is "DEV0000000002".

Figure 16:
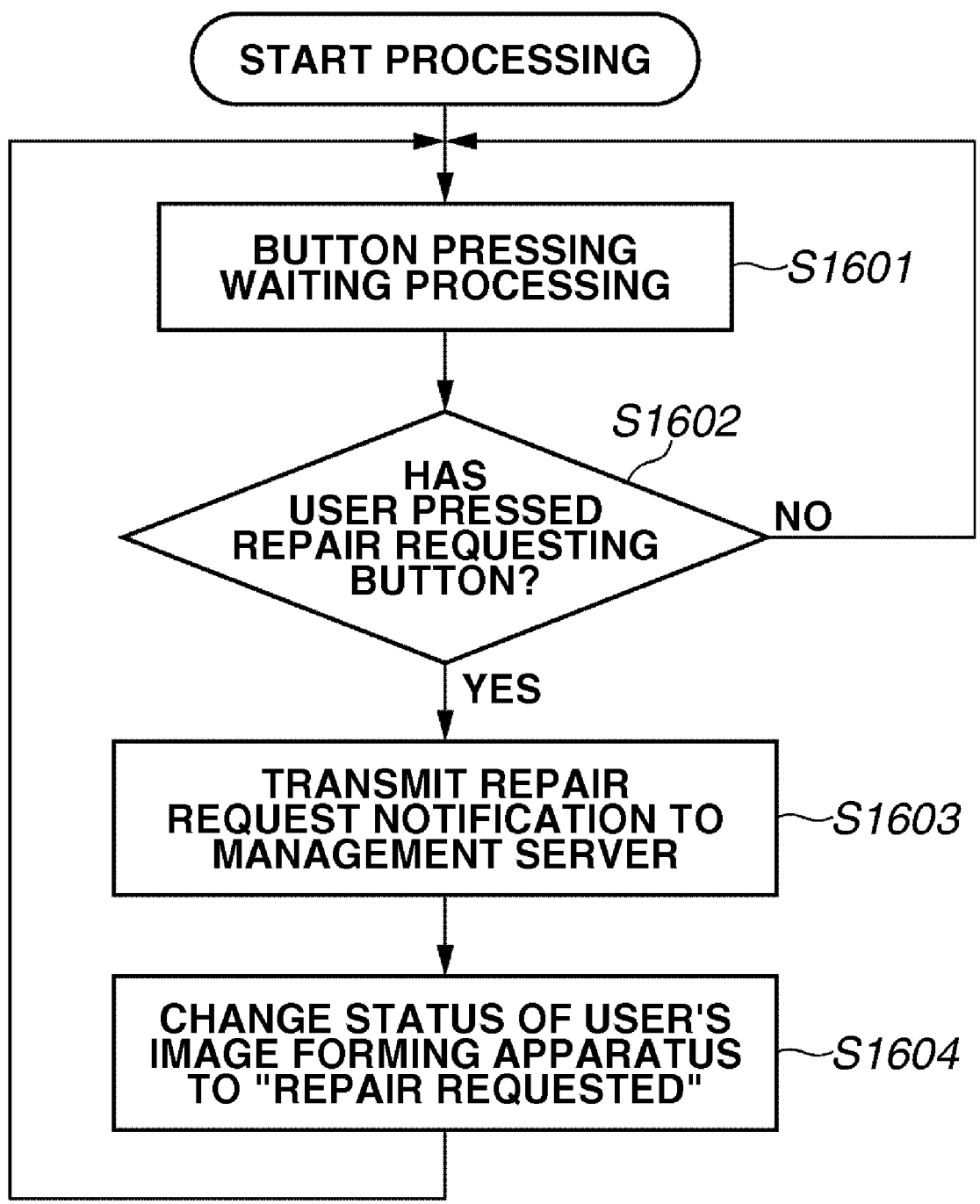
FIG. 16 is a flow chart illustrating an example of data processing executed by the image forming apparatus according to an exemplary embodiment of the present invention.

FIG. 16 is a flow chart illustrating an example of data processing executed by the image forming apparatus according to the present exemplary embodiment. The exemplary processing illustrated in FIG. 16 is executed in the case where the user has pressed the repair requesting button included in the operation unit 201 of the image forming apparatus 102. Each step is executed by the repair requesting button pressing information management unit 204 and the notification management unit 205 of the control unit 203.

Note that the user can press the repair requesting button included in the operation unit 201 of the image forming apparatus 102 in notifying a repair request indicating that it is necessary to dispatch a service engineer with respect to the failure to the management server 106.

Referring to FIG. 16, in step S1601, the control unit 203 executes processing for waiting for the user to press a button and determines whether the user has pressed any button on the panel of the operation unit 201 of the image forming apparatus 102. When the control unit 203 detects that the user has pressed any button on the panel of the operation unit 201, the processing advances to step S1602. In step S1602, the control unit 203 determines whether the user has pressed the repair requesting button. If it is determined by the control unit 203 in step S1602 that the user has pressed the repair requesting button (YES in step S1602), then the processing advances to step S1603.

On the other hand, if it is determined in step S1602 that the repair requesting button has not been pressed by the user (NO in step S1602), then the processing returns to step S1601. In step S1601, the control unit 203 repeats the button pressing waiting processing.

In step S1603, the control unit 203 notifies that the repair requesting button has been pressed by the user to the management server 106 via the communication unit 207. In step S1604, the control unit 203 changes the repair request status of the image forming apparatus 102 itself managed therein and stored on the storage unit 206 to "repair requested". Then, the processing returns to step S1601. In step S1601, the control unit 203 repeats the button pressing waiting processing.

Figure 17:
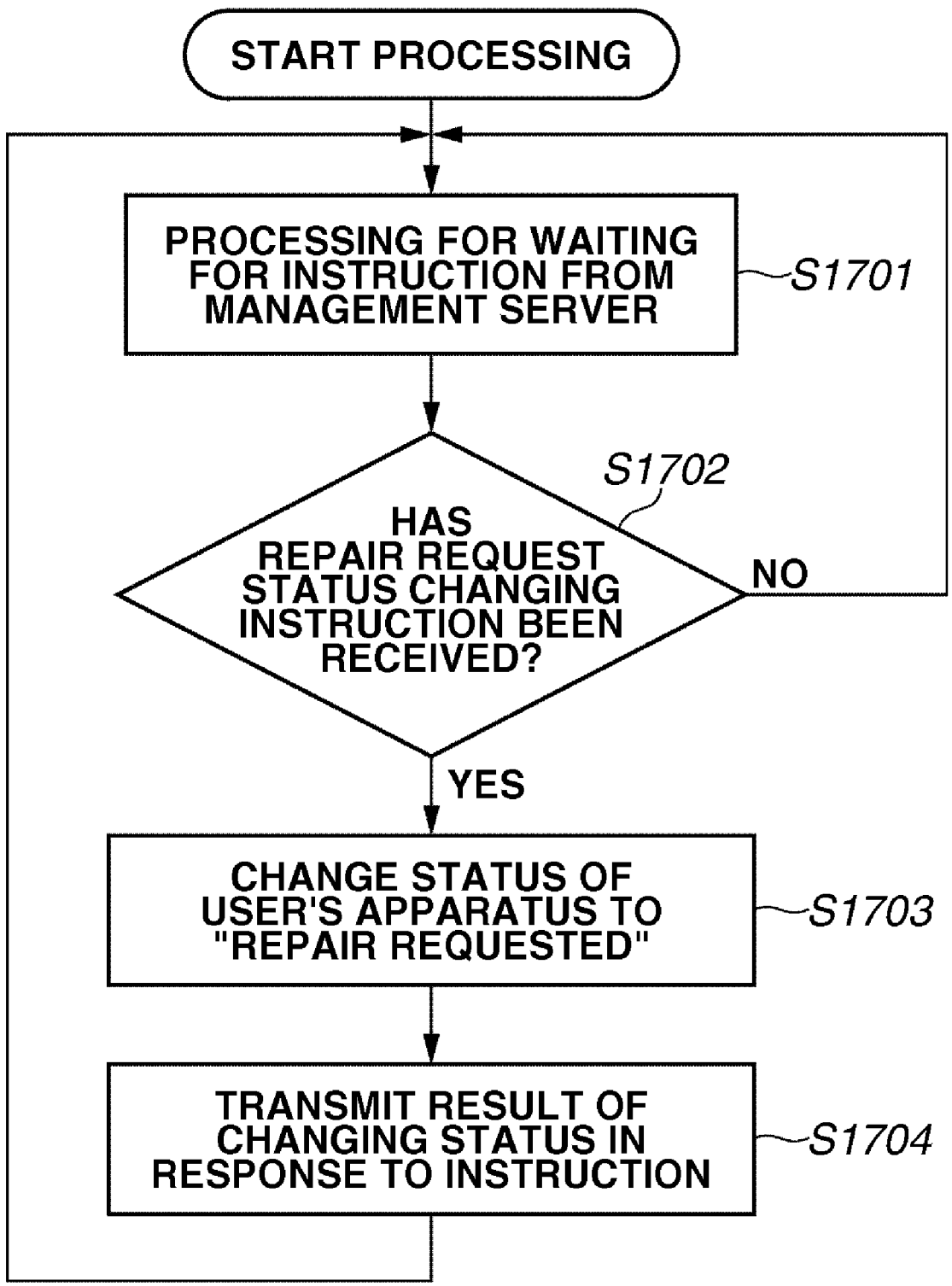
FIG. 17 is a flow chart illustrating an example of data processing executed by the image forming apparatus according to an exemplary embodiment of the present invention.

FIG. 17 is a flow chart illustrating an example of data processing executed by the image forming apparatus according to the present exemplary embodiment. The exemplary processing illustrated in FIG. 17 is executed in the case where the list storing the analysis results has been directly received from the management server 106 after the user has pressed the repair requesting button included in the operation unit 201 of the image forming apparatus 102. Each step is executed by the repair requesting button pressing information management unit 204 and the notification management unit 205 of the control unit 203.

Referring to FIG. 17, in step S1701, the control unit 203 executes processing for waiting for receiving an instruction from the management server 106 via the communication unit 207. In step S1702, the control unit 203 determines whether the instruction issued from the management server 106 is an instruction for changing the status of the repair request. The instruction issued from the management server 106 corresponds to the instruction transmitted in step S1514 (FIG. 15).

If it is determined by the control unit 203 in step S1702 that the instruction issued from the management server 106 is an instruction for changing the status of the repair request (YES in step S1702), then the processing advances to step S1703. In step S1703, the control unit 203 changes the status of the repair request issued from the image forming apparatus 102 itself managed therein and stored on the storage unit 206 to "repair requested".

On the other hand, if it is determined by the control unit 203 in step S1702 that the instruction issued from the management server 106 is not an instruction for changing the status of the repair request (NO in step S1702), then, the processing returns to step S1701. In step S1701, the control unit 203 repeats the processing for waiting for receiving an instruction from the management server 106.

In step S1704, the control unit 203 transmits the result of the change in the repair request status executed in step S1703 (OK/NG) to the image forming apparatuses via the communication unit 207 in response to the change in the repair request status executed in step S1703. Then, the processing returns to step S1701. In step S1701, the control unit 203 repeats the processing for waiting for receiving an instruction from the management server 106.

With the above-described configuration, the present exemplary embodiment can achieve the following effects by directly issuing an instruction to the repair request target image forming apparatus 102 based on the result of the analysis executed by the management server 106.

That is, the present exemplary embodiment can notify the analysis result from the management server 106 even in the case where the image forming apparatus 102 that does not include a function for executing a communication among the image forming apparatuses 102 exists.

The second exemplary embodiment of the present invention has the above-described configuration and control configuration and stores the above-described information table. In addition, the management server 106 and the image forming apparatus 102 execute the above-described processing according to the processing flow described in detail above. However, the above-described configurations are mere examples and do not limit the scope of an exemplary embodiment of the present invention.

Hereinbelow, a configuration of a data processing program that can be read by a device management system including a management server and an image forming apparatus according to an exemplary embodiment of the present invention will be described with reference to memory maps illustrated in FIGS. 18 and 19.

FIG. 18 illustrates a memory map of a storage medium that stores various data processing programs that can be read by a management server according to an exemplary embodiment of the present invention.

FIG. 19 illustrates a memory map of a storage medium that stores various data processing programs that can be read by an image forming apparatus according to an exemplary embodiment of the present invention.

Although not illustrated in FIGS. 18 and 19, information for managing the programs stored in the storage medium such as version information and information concerning the creator of a program, for example, can be stored in the storage medium. In addition, information that depends on an operating system (OS) of an apparatus that reads the program, such as an icon for identifying and displaying the program, can be stored in the storage medium.

In addition, data that is subordinate to the various programs is also managed in a directory of the storage medium. In addition, a program for installing the various programs on a computer can be stored in the storage medium. In addition, in the case where a program to be installed is compressed, a program for decompressing the compressed program can be stored in the storage medium.

In addition, the functions according to the above-described exemplary embodiments shown in FIG. 8, FIGS. 10 and 11, and FIGS. 15 through 17 can be implemented by a host computer using a program that is externally installed. In this case, the present invention is applied to the case where a group of information including a program is supplied to an output device from a storage medium such as a compact disc-read only memory (CD-ROM), a flash memory, and a floppy disk (FD) or from an external storage medium through a network.

The present invention can also be achieved by providing a system or an apparatus with a storage medium storing program code of software implementing the functions of the embodiments and by reading and executing the program code stored in the storage medium with a computer of the system or the apparatus (a central processing unit (CPU) or a micro processing unit (MPU)).

In this case, the program code itself, which is read from the storage medium, implements the functions of the embodiments described above, and accordingly, the storage medium storing the program code constitutes the present invention.

Accordingly, the program can be configured in any form, such as object code, a program executed by an interpreter, and script data supplied to an OS.

As the storage medium for supplying such program code, a floppy disk, a hard disk, an optical disk, a magneto-optical disk, a magneto-optical disk (MO), a CD-ROM, a compact disc recordable (CD-R), a compact disc rewritable (CD-RW), a magnetic tape, a nonvolatile memory card, a read only memory (ROM), and a digital versatile disc (DVD (DVD-recordable (DVD-R), DVD-rewritable (DVD-RW))), for example, can be used.

In this case, the program code itself, which is read from the storage medium, implements the function of the embodiments mentioned above, and accordingly, the storage medium storing the program code constitutes the present invention.

The above program can also be supplied by connecting to a web site on the Internet by using a browser of a client computer and by downloading the program from the web site to a storage medium such as a hard disk. In addition, the above program can also be supplied by downloading a compressed file that includes an automatic installation function from the web site to a storage medium such as a hard disk.

The functions of the above embodiments can also be implemented by dividing the program code into a plurality of files and downloading each divided file from different web sites. That is, a World Wide Web (WWW) server and a file transfer protocol (ftp) server for allowing a plurality of users to download the program file for implementing the functional processing configure the present invention.

In addition, the above program can also be supplied by distributing a storage medium such as a CD-ROM and the like which stores the program according to the present invention after an encryption thereof, by allowing the user who is qualified for a prescribed condition to download key information for decoding the encryption from the web site via the Internet, and by executing and installing in the computer the encrypted program code by using the key information.

In addition, the functions according to the embodiments described above can be implemented not only by executing the program code read by the computer, but also implemented by the processing in which an OS or the like carries out a part of or the whole of the actual processing based on an instruction given by the program code.

Furthermore, in another aspect of the embodiment of the present invention, after the program code read from the storage medium is written in a memory provided in a function expansion board inserted in a computer or a function expansion unit connected to the computer, a CPU and the like provided in the function expansion board or the function expansion unit carries out a part of or the whole of the processing to implement the functions of the embodiments described above.

While the present invention has been described with reference to exemplary embodiments is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-046585 filed Feb. 27, 2008, which is hereby incorporated by reference herein in its entirety.

What is claimed is:

1. A management server configured to manage a plurality of image forming apparatuses capable of executing data communication with the management server and to execute processing for dispatching a service engineer with respect to at least one of the plurality of image forming apparatuses, the management server comprising:
   an acquisition unit configured to acquire operation information and failure information from each of the plurality of image forming apparatuses;
   a storage unit configured to store the operation information and the failure information about the plurality of image forming apparatuses acquired by the acquisition unit;
   a first detection unit configured to detect an image forming apparatus that requires the dispatch of a service engineer based on first analysis processing executed by using either one of or both of the operation information and the failure information about the plurality of image forming apparatuses stored on the storage unit;
   a second detection unit configured to detect an image forming apparatus that requires the dispatch of a service engineer based on second analysis processing, which is different from the first analysis processing, executed by using either one of or both of the operation information and the failure information about the plurality of image forming apparatuses stored on the storage unit in response to the first detection unit having detected the image forming apparatus that requires the dispatch of a service engineer; and
   an execution unit configured to execute processing for dispatching a service engineer with respect to the image forming apparatuses that have been respectively detected by the first detection unit and the second detection unit,
   wherein the first analysis processing includes processing for analyzing whether it is required to dispatch a service engineer with respect to a failure occurring on at least one of the plurality of image forming apparatuses, and
   wherein the second analysis processing includes processing for analyzing whether it is predicted that a failure that requires requesting the dispatch of a service engineer occurs on at least one of the plurality of image forming apparatuses.

2. The management server according to claim 1, wherein the failure information includes a repair request for requesting the dispatch of a service engineer issued from at least one of the plurality of image forming apparatuses and information about an error that requires requesting the dispatch of a service engineer.

3. The management server according to claim 1, wherein in the second analysis processing, a processing load on the management server is higher than a processing load on the management server in the first analysis processing.

4. The management server according to claim 1, wherein, in response to the first detection unit having detected the image forming apparatus that requires the dispatch of a service engineer, the second detection unit is configured to execute the second analysis processing on an image forming apparatus related to the detected image forming apparatus, of the plurality of image forming apparatuses, to detect an image forming apparatus that requires the dispatch of a service engineer.

5. The management server according to claim 1, wherein the first detection unit is configured to detect an image forming apparatus that requires the dispatch of a service engineer based on a repair request for requesting the dispatch of a service engineer issued from the image forming apparatus; and
   wherein the management server further comprises a notification unit configured to notify the image forming apparatus that has issued the repair request that a service engineer is scheduled to be dispatched to the image forming apparatuses respectively detected by the first detection unit and the second detection unit in response to the repair request.

6. A management method for a management server configured to manage a plurality of image forming apparatuses capable of executing data communication with the management server and to execute processing for dispatching a service engineer with respect to at least one of the plurality of image forming apparatuses, the management method comprising:
   acquiring operation information and failure information from each of the plurality of image forming apparatuses;
   storing the acquired operation information and failure information about the plurality of image forming apparatuses;
   executing first detection processing for detecting an image forming apparatus that requires the dispatch of a service engineer based on first analysis processing executed by using either one of or both of the stored operation information and failure information about the plurality of image forming apparatuses;
   executing second detection processing for detecting an image forming apparatus that requires the dispatch of a service engineer based on second analysis processing, which is different from the first analysis processing, executed by using either one of or both of the stored operation information and failure information about the plurality of image forming apparatuses in response to the first detection processing having detected the image forming apparatus that requires the dispatch of a service engineer; and
   executing processing for dispatching a service engineer with respect to the image forming apparatuses that have been respectively detected by the first detection processing and the second detection processing,
   wherein the first analysis processing includes processing for analyzing whether it is required to dispatch a service engineer with respect to a failure occurring on at least one of the plurality of image forming apparatuses, and
   wherein the second analysis processing includes processing for analyzing whether it is predicted that a failure that requires requesting the dispatch of a service engineer occurs on at least one of the plurality of image forming apparatuses.

7. The management method according to claim 6, wherein the failure information includes a repair request for requesting the dispatch of a service engineer issued from at least one of the plurality of image forming apparatuses and information about an error that requires requesting the dispatch of a service engineer.

8. The management method according to claim 6, wherein in the second analysis processing, a processing load on the management server is higher than a processing load on the management server in the first analysis processing.

9. The management method according to claim 6, further comprising, in response to the first detection processing having detected the image forming apparatus that requires the dispatch of a service engineer, executing the second analysis processing on an image forming apparatus related to the detected image forming apparatus, of the plurality of image forming apparatuses, to detect an image forming apparatus that requires the dispatch of a service engineer.

10. The management method according to claim 6, further comprising:
   detecting an image forming apparatus that requires the dispatch of a service engineer based on a repair request for requesting the dispatch of a service engineer issued from the image forming apparatus; and
   notifying the image forming apparatus that has issued the repair request that a service engineer is scheduled to be dispatched to the image forming apparatuses respectively detected by the first detection processing and the second detection processing in response to the repair request.

11. A non-transitory computer-readable storage medium containing computer-executable instructions for controlling a management server configured to manage a plurality of image forming apparatuses capable of executing data communication with the management server and to execute processing for dispatching a service engineer with respect to at least one of the plurality of image forming apparatuses, the medium comprising: computer-executable instructions for acquiring operation information and failure information from each of the plurality of image forming apparatuses; computer-executable instructions for storing the acquired operation information and failure information about the plurality of image forming apparatuses; computer-executable instructions for executing first detection processing for detecting an image forming apparatus that requires the dispatch of a service engineer based on first analysis processing executed by using either one of or both of the stored operation information and failure information about the plurality of image forming apparatuses; computer-executable instructions for executing second detection processing for detecting an image forming apparatus that requires the dispatch of a service engineer based on second analysis processing, which is different from the first analysis processing, executed by using either one of or both of the stored operation information and failure information about the plurality of image forming apparatuses in response to the first detection processing having detected the image forming apparatus that requires the dispatch of a service engineer; and computer-executable instructions for executing processing for dispatching a service engineer with respect to the image forming apparatuses that have been respectively detected by the first detection processing and the second detection processing, wherein the first analysis processing includes processing for analyzing whether it is required to dispatch a service engineer with respect to a failure occurring on at least one of the plurality of image forming apparatuses, and wherein the second analysis processing includes processing for analyzing whether it is predicted that a failure that requires requesting the dispatch of a service engineer occurs on at least one of the plurality of image forming apparatuses.

* * * * *